United States Patent
Dextreit (10) Patent No.: US 9,821,791 B2
(45) Date of Patent: Nov. 21, 2017

(54) HYBRID VEHICLE CONTROLLER AND METHOD OF CONTROLLING A HYBRID VEHICLE

(71) Applicant: Jaguar Land Rover Limited, Coventry (GB)

(72) Inventor: Clement Dextreit, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/374,394

(22) PCT Filed: Jan. 24, 2013

(86) PCT No.: PCT/EP2013/051346
§ 371 (c)(1),
(2) Date: Jul. 24, 2014

(87) PCT Pub. No.: WO2013/110709
PCT Pub. Date: Aug. 1, 2013

(65) Prior Publication Data
US 2015/0039169 A1  Feb. 5, 2015

(30) Foreign Application Priority Data
Jan. 25, 2012  (GB) .................................. 1201255.5

(51) Int. Cl.
*B60W 50/08* (2012.01)
*B60W 50/00* (2006.01)
(Continued)

(52) U.S. Cl.
CPC .............. *B60W 20/13* (2016.01); *B60L 11/14* (2013.01); *B60L 11/1862* (2013.01);
(Continued)

(58) Field of Classification Search
CPC .... B60W 20/13; B60W 20/106; B60W 20/12; B60W 20/20; B60W 50/082;
(Continued)

(56) References Cited

U.S. PATENT DOCUMENTS 7,389,838 B2 *  6/2008  Yamaguchi ............ B60K 6/485
                                                                 180/65.265
9,067,589 B1 *  6/2015  Zhao .................... B60W 20/104
(Continued)

FOREIGN PATENT DOCUMENTS

DE    102010021031 A1 *  11/2011
EP       2 070 788 A1      6/2009
(Continued)

OTHER PUBLICATIONS

Avl List GMBH; et al. Translation of WO 2011/134992 A1 obtained from EspaceNet on Aug. 24, 2015. File name: WO2011134992_Translation.*

*Primary Examiner* — Rami Khatib
*Assistant Examiner* — Jeffrey Boomer
(74) *Attorney, Agent, or Firm* — Myers Bigel, P.A.

(57) ABSTRACT

The invention relates to a controller (140) for a hybrid electric vehicle (HEV), the controller (140) being operable to control a HEV to assume a HEV mode of operation in which each of a plurality of actuators (121, 123) of a HEV is controlled to assume a prescribed operational state, the controller being configured to control a HEV to assume an operational mode responsive to data in respect of a route of a journey to be made by a HEV, a route comprising at least one route segment, the controller (140) being configured to determine a target state of charge of an energy storage device (150) of a HEV for each said at least one route segment being a state of charge of an energy storage device (150) that is to be achieved at the end of said at least one segment responsive to the data in respect of a route, the controller
(Continued)

(140) being further configured to control the HEV to achieve the target state of charge at the end of said at least one segment.

21 Claims, 3 Drawing Sheets

(51) Int. Cl.

| | |
|---|---|
| *B60W 10/06* | (2006.01) |
| *B60W 10/08* | (2006.01) |
| *B60W 10/26* | (2006.01) |
| *B60L 11/18* | (2006.01) |
| *B60L 11/14* | (2006.01) |
| *B60W 20/13* | (2016.01) |
| *B60W 20/20* | (2016.01) |
| *B60W 20/12* | (2016.01) |

(52) U.S. Cl.
CPC ............ *B60W 10/06* (2013.01); *B60W 10/08* (2013.01); *B60W 10/26* (2013.01); *B60W 20/12* (2016.01); *B60W 20/20* (2013.01); *B60W 50/0097* (2013.01); *B60W 50/082* (2013.01); B60L 2240/12 (2013.01); B60L 2240/645 (2013.01); B60L 2250/20 (2013.01); B60L 2260/54 (2013.01); B60W 2510/244 (2013.01); B60W 2520/10 (2013.01); B60W 2540/28 (2013.01); B60W 2540/30 (2013.01); B60W 2550/141 (2013.01); B60W 2710/244 (2013.01); Y02T 10/6291 (2013.01); Y02T 10/70 (2013.01); Y02T 10/705 (2013.01); Y02T 10/7005 (2013.01); Y02T 10/7044 (2013.01); Y02T 10/7077 (2013.01); Y02T 10/7291 (2013.01); Y02T 90/16 (2013.01); Y10S 903/93 (2013.01)

(58) Field of Classification Search
CPC .. B60W 50/0097; B60W 10/06; B60W 10/08; B60W 10/26; B60W 2710/244; B60W 2520/10; B60W 2540/28; B60W 2540/30; B60W 2550/141; B60W 2510/244; B60L 11/1862; B60L 11/14; B60L 2240/645; B60L 2260/54; B60L 2250/20; B60L 2240/12; Y02T 10/70; Y02T 10/7044; Y02T 10/7077; Y02T 10/7291; Y02T 90/16; Y02T 10/705; Y02T 10/7005; Y02T 10/6291; Y10S 903/93
See application file for complete search history.

(56) References Cited

U.S. PATENT DOCUMENTS

| | | | |
|---|---|---|---|
| 2002/0096886 A1* | 7/2002 | Schmitz | B60K 6/46 290/40 C |
| 2004/0074682 A1* | 4/2004 | Fussey | B60K 6/12 180/65.21 |
| 2008/0262668 A1* | 10/2008 | Yamada | B60K 6/46 701/22 |
| 2008/0319596 A1 | 12/2008 | Yamada | |
| 2009/0112395 A1* | 4/2009 | Prokhorov | G01M 15/05 701/31.4 |
| 2009/0259355 A1* | 10/2009 | Li | B60K 6/445 701/22 |
| 2009/0277701 A1 | 11/2009 | Soma et al. | |
| 2010/0131139 A1* | 5/2010 | Sakai | B60K 6/46 701/22 |
| 2011/0246019 A1 | 10/2011 | Mineta | |
| 2012/0010767 A1* | 1/2012 | Phillips | G01C 21/3469 701/22 |
| 2012/0035795 A1* | 2/2012 | Yu | B60W 50/0097 701/22 |
| 2013/0073132 A1* | 3/2013 | Ungermann | B60W 40/09 701/22 |

FOREIGN PATENT DOCUMENTS

| | | |
|---|---|---|
| EP | 2 071 285 A1 | 6/2009 |
| JP | 2003-111209 | 4/2003 |
| JP | 2009-137340 | 6/2009 |
| WO | WO 2010/144042 A1 | 12/2010 |
| WO | WO 2011/128410 A1 | 10/2011 |
| WO | WO 2011/134992 A1 | 11/2011 |

* cited by examiner

Figure 1

| Segment | Built-up | Road Type | Avg Speed (kph) | Length (km) |
|---|---|---|---|---|
| 1 | 1 | FC4 | 40 | 5 |
| 2 | 0 | FC2 | 60 | 10 |
| 3 | 0 | FC1 | 115 | 30 |

HYBRID VEHICLE CONTROLLER AND METHOD OF CONTROLLING A HYBRID VEHICLE

RELATED APPLICATIONS

This application is a 35 U.S.C. §371 national stage application of PCT Application No. PCT/EP2013/051346, filed on Jan. 24, 2013, which claims priority from Great Britain Patent Application No. 1201255.5, filed Jan. 25, 2012, the contents of which are incorporated herein by reference in their entireties. The above-referenced PCT International Application was published in the English language as International Publication No. WO 2013/110709 A1 on Aug. 1, 2013.

FIELD OF THE INVENTION

The present invention relates to apparatus for controlling a hybrid electric vehicle and to a method of controlling a hybrid electric vehicle.

BACKGROUND

It is known to provide a hybrid electric vehicle (HEV) having an engine and an electric machine each operable to drive the vehicle. A controller is operable to control the vehicle to operate in one of several HEV modes or HEV powertrain modes that include an electric vehicle (EV) mode and a plurality of parallel modes.

In EV mode the engine is switched off and the electric machine is operated as a motor to apply a positive torque to a driveline of the vehicle. In a parallel boost mode the engine and electric machine both apply positive torque to the driveline. In some HEVs, in a parallel recharge mode the engine applies a positive torque to the driveline whilst the electric machine (which may for example be a crankshaft integrated starter generator (CIMG) is operated as a generator and applies a negative torque to the driveline. The engine therefore provides torque to drive the generator in addition to providing torque to propel the vehicle.

In some HEVs, a controller is arranged to control the vehicle initially to operate in electric vehicle (EV) mode until a state of charge (SoC) of the battery has fallen to a value of 50% of the battery's total capacity. The vehicle is then operated in such a manner as to sustain this SoC by assuming one of the HEV modes selected according to a particular hybrid powertrain control methodology.

A number of different hybrid powertrain control methodologies have been employed in an attempt to optimise powertrain operation. For example a methodology may seek to minimise an amount of fuel consumed by the vehicle over a given drivecycle and/or an amount of carbon dioxide emitted over the drivecycle.

It is an aim of embodiments of the present invention to improve an efficiency and drivability of a hybrid electric vehicle.

STATEMENT OF THE INVENTION

In one aspect of the invention there is provided a controller for a hybrid electric vehicle (HEV), the controller being operable to control a HEV to assume a HEV mode of operation in which each of a plurality of actuators of a HEV is controlled to assume a prescribed operational state, the controller being configured to control a HEV to assume an operational mode in dependence on or responsive to data in respect of a route of a journey to be made by a HEV, a route comprising at least one route segment, the controller being configured to determine a target state of charge of an energy storage device of a HEV for each said at least one route segment being a state of charge of an energy storage device that is to be achieved at the end of said at least one segment responsive to the data in respect of a route, the controller being further configured to control a HEV to achieve the target state of charge at the end of said at least one segment.

The energy storage device may comprise a device for powering a propulsion motor of a HEV.

In a further aspect of the invention for which protection is sought there is provided a controller operable to control a hybrid electric vehicle (HEV) to assume one of a plurality of modes of operation in each of which each of a plurality of actuators of a HEV is controlled to assume a prescribed operational state, the controller being configured to control the HEV to assume a selected one of the plurality of operational modes in dependence on data in respect of a route of a journey to be made by the HEV, a route comprising at least one route segment, the controller being configured to determine a target value of state of charge of energy storage means of the HEV for each said at least one route segment being a value of state of charge of the energy storage means that is to be achieved at the end of said at least one segment in dependence on the data in respect of a route, the controller being further configured to control the HEV to achieve the target state of charge value at the end of said at least one segment.

Embodiments of the invention have the advantage that selection of a target state of charge and a most appropriate hybrid mode may be made responsive to one or more characteristics of each route segment known in advance by the controller. This allows an efficiency of operation of the vehicle to be enhanced since the controller is able to optimise state of charge selection and vehicle operation for a particular route taking into account the data in respect of at least one characteristic of a route segment.

The controller may be operable to calculate different respective values of target state of charge for each route segment. The target values may be specific values. The controller may be configured to control the vehicle to achieve the target state of charge value for each segment at the end of each segment, optionally to within an allowed tolerance. The allowed tolerance may be for example 0.5%, 1%, 2%, 5% or any other suitable value.

In addition, an ability of a HEV to meet driver expectation and legislative requirements is also enhanced. For example, a route may have a route segment that passes through a congested area in which operation in EV mode is preferred by the driver. Operation in EV mode over a given route segment may be mandated by legislation in some cases.

The controller may therefore control the vehicle in such a manner that when a particular route segment is driven, the state of charge of the energy storage device is sufficiently high at the start of the segment to allow the vehicle to drive the length of the segment without requiring operation in a parallel mode.

Thus, the controller may control the vehicle to charge the energy storage device in advance of driving the segment if required.

The actuators of a HEV may comprise at least one fuel burning actuator and at least one electric machine, said at least one electric machine being operable to drive a HEV, the controller being operable to control at least one fuel burning actuator to generate charge to recharge an energy storage device.

Advantageously the controller may be configured to select a target state of charge of an energy storage device responsive to data in respect of an amount of energy consumed by a plurality of actuators and a change in state of charge of an energy storage device in each operational mode as a function of vehicle speed.

This allows the controller to further optimise selection of the most appropriate hybrid mode for the journey. This is because the rate at which energy is consumed by the actuators in a given hybrid mode and the rate of change of state of charge will change as a function of vehicle speed.

Further advantageously the controller may be operable to select a target state of an energy storage device responsive to data in respect of an amount of energy consumed by a plurality of actuators and a change in state of charge of an energy storage device in each operational mode at an expected speed of a vehicle over a route segment.

Thus the controller may be configured to employ a value corresponding to that for a speed at which a vehicle is expected to be travelling along a given route segment. Expected vehicle speed may be determined responsive to specific average speed data for a give route segment, or responsive to road type.

Advantageously the controller may be operable to select a target state of charge responsive to data in respect of a type of a driver.

This feature has the advantage that the controller may take into account a manner in which the driver drives a vehicle in optimising target state of charge determination and hybrid mode selection. Thus, if a driver is determined to be a relatively aggressive driver, for example if a driver tends to demand relatively high rates of acceleration and deceleration, and/or drives at a particularly high average speed, the controller may set a target state of charge responsive to this knowledge. For example, the controller may increase the target state of charge relative to a baseline value over one or more segments in order to provide additional torque boost capability for a vehicle.

Conversely, the controller may decrease a target state of charge relative to a baseline value over one or more segments if a driver is determined to be relatively unaggressive, for example if a driver demands relatively low average rates of acceleration and/or deceleration and/or drives at a relatively low average speed. Thus a vehicle may be made more efficient with a less aggressive driver.

Data in respect of a type of a driver may be stored in a database such as in an onboard memory or a remote storage device for reference when calculating target state of charge and powertrain mode for a given route segment.

Alternatively or in addition driver type may be determined by reference to one or more control inputs made by a driver during the course of a journey. The control inputs may be selected from amongst steering wheel angle, rate of change of steering wheel angle, throttle pedal position, rate of change of throttle pedal position, brake pedal position, rate of change of brake pedal position, brake pressure, rate of change of brake pressure, instantaneous rate of acceleration, instantaneous rate of deceleration, average rate of acceleration and average rate of deceleration.

Other arrangements are also useful.

The controller may be operable to determine a type of driver responsive to at least one selected from amongst an identity of a device carried by a driver, an input provided by a driver and a driving style of a driver.

A device carried by a driver may be a key, a key fob, a key card, a tag or any other suitable device a driver may carry and by means of which a controller may identify a driver driving a vehicle.

An input provided by a driver may be an input specifically to identify a driver or an input in respect of a preferred configuration of one or more parameters such as a seat setting, a steering wheel setting, a mirror setting or any other suitable setting.

Advantageously if a journey comprises a plurality of segments the controller may be configured to monitor a deviation of an actual state of charge of an energy storage means at an end of a given route segment from a target state of charge and to recalculate at least one of a target state of charge and a HEV operational mode for each remaining segment responsive to the deviation.

Thus the controller may be configured to implement a closed loop feedback methodology to provide real-time correction of the target state of charge and/or selected HEV operational mode for each remaining segment.

This feature has the advantage that the controller is adaptive to actual HEV performance during the course of a journey. The controller controls a HEV to compensate for the deviation over one or more remaining journey segments.

In the case that the target state of charge is recalculated, the controller thereby provides a 'moving' target state of charge responsive to HEV performance over the course of a journey.

Further advantageously the controller may be configured to set a target value of state of charge of an energy storage device that is to be achieved at a destination of a vehicle responsive to data in respect of a particular destination.

It is to be understood that a target state of charge at a destination may correspond to a target state of charge at the end of a final route segment of a journey. In the case of a journey having only one route segment the target state of charge at the destination may correspond to a target state of charge at the end of a route segment.

Advantageously the controller may be configured to set a target state of charge responsive to a determination whether the energy storage device will be recharged at the destination.

The controller may be operable to determine whether the energy storage means will be recharged at the destination in response to at least one selected from amongst data in respect of a historical journey made by the vehicle, a database of recharging facilities and an input received from a user.

The controller may be operable to determine whether a recharging facility is available at the destination responsive to at least one selected from amongst data in respect of a historical journey made by the vehicle and a database of recharging facilities.

Thus in some embodiments, in respect of each vehicle journey the controller may store data indicating whether a vehicle's energy storage device has previously been recharged at the destination. Alternatively or in addition the controller may consult a database to determine whether a recharging facility is available at the destination.

If a recharging facility exists at the destination, the controller may be operable to control the vehicle preferentially to operate in EV mode where possible (e.g. where driver torque demand permits, and/or where a driver demanded speed permits operation in EV mode) so as to substantially discharge the battery, e.g. to or towards a minimum state of charge, by the end of the journey.

In some embodiments the data in respect of a particular destination may include an indication from a driver as to whether the vehicle will be recharged at the destination. Thus, regardless of whether a recharging facility exists, the controller may be operable to receive data indicating whether recharging will take place. Other arrangements are also useful.

If no recharging facility exists at the destination the controller may be operable to allow the state of charge to reduce to a prescribed value being a value above minimum state of charge, e.g. a value corresponding to 50% state of charge or any other suitable value. Other arrangements are also useful.

Advantageously the controller may be arranged to determine, for each HEV operational mode, an amount of energy that would be required to complete each route segment in that mode and a change in state of charge of an energy storage device over a segment at a prescribed average speed in that mode, said speed being a speed in respect of each segment, the controller being further configured to determine an optimum HEV mode for each segment and an optimum target state of charge of an energy storage device for each route segment according to one or more optimisation control algorithms.

The controller may be arranged to apply the control algorithm thereby to minimise a total amount of energy consumed by a plurality of actuators over a route.

Advantageously the controller may be further configured to apply a deterministic dynamic programming control algorithm to determine which of the HEV operational modes the apparatus should employ over each segment of a journey.

The determination may be made so as to manage a controlled change in state of charge of the energy storage device SoC from that at the start of the journey to that required at the end of the journey whilst controlling a powertrain of a HEV to use a minimum amount of total energy.

Advantageously said at least one characteristic of said at least one route segment is selected from amongst a length thereof, a type of road thereof, an expected average speed of a HEV therealong, an expected variance of speed of a HEV therealong, an expected average journey time therealong and an indication whether a segment corresponds to a built-up area.

The controller may be configured to determine a target state of charge of an energy storage device for each route segment in order to improve one or more performance parameters of a HEV relative to operation in a HEV mode in which only at least one fuel burning actuator is switched on and employed to provide traction to drive a HEV for each segment of a journey.

Thus if the controller may be used to control a parallel HEV in which at least one fuel burning actuator is operable to drive the HEV. The controller may control the HEV such that at least one performance parameter is improved relative to operation of the HEV without use of the at least one electric machine and with the at least one fuel burning actuator latched in an on condition.

Advantageously the one or more performance parameters may correspond to one or more selected from amongst an amount of a given gas emitted by at least one fuel burning actuator of the vehicle over the course of a journey, an amount of fuel consumed by at least one fuel burning actuator over the course of a journey and an amount of time for which at least one fuel burning actuator is switched on over the course of a journey.

Each route may comprise a plurality of route segments, the controller being configured to determine a respective target value of state of charge of energy storage means of the HEV for each route segment, being a value of state of charge of the energy storage means that is to be achieved at the end of each segment.

It is to be understood that the target values of state of charge may be different values for each route segment in order to maximise vehicle performance, e.g. by minimising emissions of one or more gases.

The target values of state of charge may be specific values, e.g. 25% charge, 40% charge. the target values may correspond to an amount of energy stored in the energy storage means, for example a value in kW, MW, Joules or any other suitable units.

In a further aspect of the invention there is provided a HEV comprising a controller according to the preceding aspect, the HEV comprising a plurality of actuators including at least one fuel burning actuator and at least one electric machine.

The HEV may be operable in a series HEV mode wherein the at least one fuel burning actuator is not operable to drive the HEV.

Alternatively or in addition the HEV may be operable in a parallel HEV mode in which the at least one fuel burning actuator and the at least one electric machine are each operable to drive the HEV.

The at least one fuel burning actuator advantageously comprises an engine.

In some embodiments a HEV is operable wherein a driver may request that a certain portion of a journey (such as one or more route segments) be completed in EV mode. This portion might for example be a portion of a journey through an area for which a charge is levied for non-EV operations or where access is only permitted when operating in EV mode.

In one aspect of the invention for which protection is sought there is provided a method of controlling a hybrid electric vehicle (HEV) to assume one of a plurality of modes of operation in each of which each of a plurality of actuators of a HEV is controlled to assume a prescribed operational state, the method comprising controlling the HEV to assume an operational mode in dependence on data in respect of a route of a journey to be made by the HEV, a route comprising at least one route segment, the method comprising determining a value of target state of charge of energy storage means of the HEV for each said at least one route segment being a value of state of charge of the energy storage means that is to be achieved at the end of said at least one segment in dependence on the data in respect of a route, and controlling the HEV to achieve the target state of charge value at the end of said at least one segment.

According to another aspect of the invention for which protection is sought, there is provided a method of controlling a hybrid electric vehicle (HEV), the HEV being operable in one or a plurality of HEV modes in which each of a plurality of actuators of a HEV is controlled to assume a prescribed operational state, the method comprising controlling the HEV to assume an operational mode in dependence on or responsive to data in respect of a route of a journey to be made by a HEV, a route comprising at least one route segment, the method comprising determining by control means a target state of charge of an energy storage device of a HEV for each said at least one route segment being a state of charge of an energy storage device that is to be achieved at the end of said at least one segment responsive to the data in respect of a route, and controlling the HEV to achieve the target state of charge at the end of a segment.

In another aspect of the invention there is provided an apparatus for controlling a hybrid electric vehicle having a powertrain comprising a plurality of actuators and a driveline, the actuators being operable to apply torque to the driveline to drive the vehicle, the plurality of actuators comprising at least one fuel burning actuator and at least one electric machine arranged to be powered by means of an energy storage device, the apparatus being operable to control the vehicle to recharge the energy storage device by means of the at least one fuel burning actuator, the apparatus being arranged to control the vehicle to operate according to a selected one of a plurality of different powertrain modes according to a prescribed powertrain control methodology, in each of the powertrain modes the plurality of actuators being configured to apply respective amounts of torque to the driveline, the apparatus being configured to control the vehicle to assume one of the powertrain modes responsive to data in respect of a route of a journey to be made by the vehicle, the route comprising a plurality of route segments, wherein the apparatus is configured to determine a target state of charge of the energy storage device for each segment being a state of charge of the energy storage device that is to be achieved at the end of that segment responsive to data in respect of a rate of consumption of energy by the vehicle in a given powertrain mode, a rate of change of state of charge in a given hybrid mode and data in respect of a type of road corresponding to each segment, the apparatus being configured to control the vehicle to achieve the target state of charge by the end of each segment.

The apparatus may be configured to determine the target state of charge for each segment thereby to optimise operation of the vehicle according to a hybrid control methodology.

In a further aspect of the invention there is provided an apparatus for controlling a hybrid electric vehicle having a plurality of actuators each operable to apply torque to a driveline of the vehicle to drive the vehicle, the plurality of actuators comprising at least one fuel burning actuator and at least one electric machine arranged to be powered by means of an energy storage device, the apparatus being operable to control the vehicle to recharge the energy storage device by means of the at least one fuel burning actuator, the apparatus being arranged to control the plurality of actuators to deliver respective amounts of torque to the driveline according to a prescribed control methodology, wherein the apparatus is configured to acquire data in respect of a route of a journey the vehicle is to make, the route comprising a plurality of route segments, and to determine a target state of charge of the energy storage device for each segment being a state of charge of the energy storage device that is to be achieved at the end of each segment, the apparatus being configured subsequently to control the vehicle to achieve the respective target states of charge by the end of each segment.

In a still further aspect of the invention there is provided apparatus for controlling a hybrid electric vehicle comprising at least one fuel burning actuator and at least one electric machine arranged to be powered by means of an energy storage device, the electric machine being operable to drive the vehicle, the apparatus being operable to control the vehicle to recharge the energy storage device by means of the at least one fuel burning actuator, the apparatus being arranged to control the vehicle to operate according to a selected one of a plurality of different powertrain modes according to a prescribed powertrain control methodology, in each of the powertrain modes each of the actuators assuming a prescribed operational state, the apparatus being configured to control the vehicle to assume one of the powertrain modes in dependence on or responsive to data in respect of a route of a journey to be made by the vehicle, a route comprising at least one route segment, wherein the apparatus is configured to determine a target state of charge of the energy storage device for each said at least one route segment being a state of charge of the energy storage device that is to be achieved at the end of said at least one segment responsive to data in respect of a rate of consumption of energy by the vehicle in a given powertrain mode, a rate of change of state of charge in a given powertrain mode and a type of road corresponding to each segment.

The at least one fuel burning actuator may be further operable to drive the vehicle.

Thus in some embodiments the apparatus may be operable to control a parallel hybrid vehicle. In some embodiments the apparatus may be operable in addition or instead to control a series hybrid vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
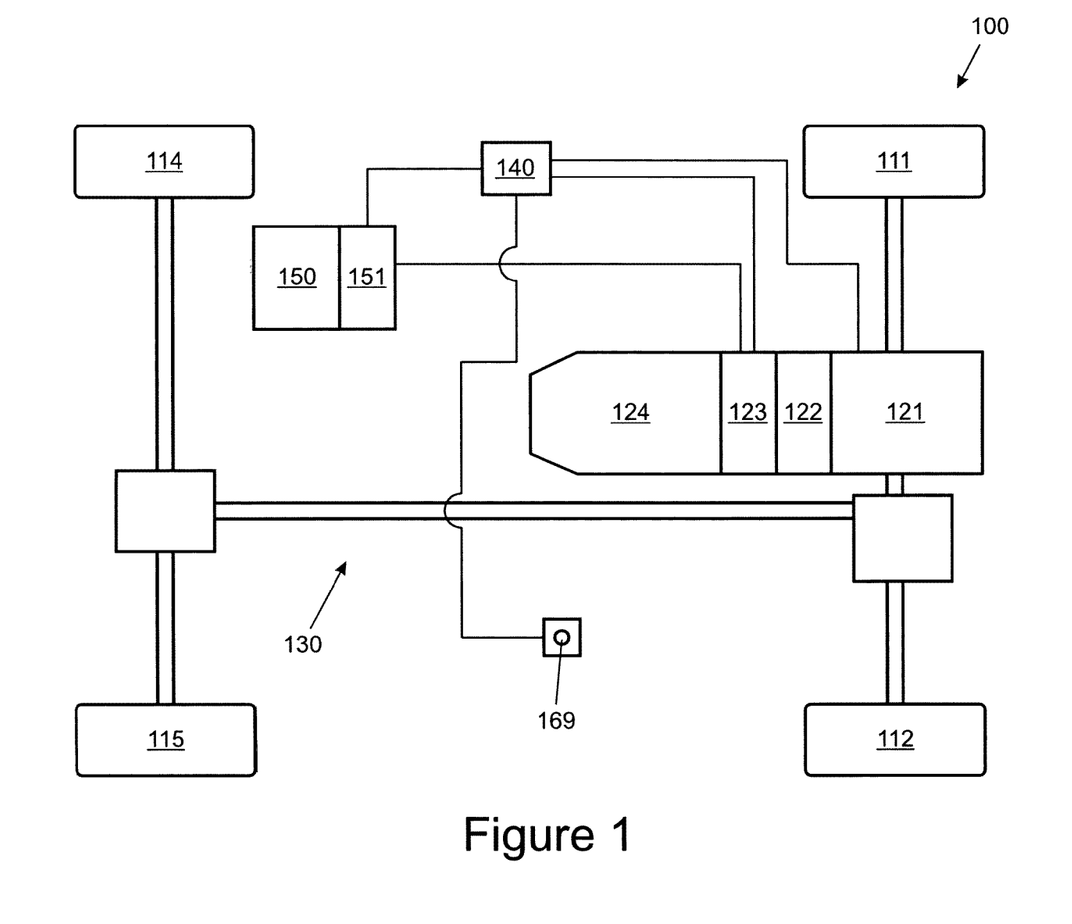
FIG. 1 is a schematic illustration of a hybrid electric vehicle according to an embodiment of the present invention.

FIG. 1 shows a hybrid electric vehicle (HEV) 100 according to an embodiment of the present invention. The vehicle 100 has an actuator in the form of an internal combustion engine 121 releasably coupled to an actuator in the form of a crankshaft integrated motor/generator (CIMG) 123 by means of a clutch 122. The CIMG 123 is in turn coupled to an automatic transmission 124. The vehicle 100 is operable to provide drive torque to the transmission 124 by means of the engine 121 alone, the CIMG 123 alone or the engine 121 and CIMG 123 in parallel.

It is to be understood that in some embodiments the transmission 124 may be a manual transmission instead of an automatic transmission. The transmission may comprise a manual gearbox, a continually variable transmission or any other suitable transmission.

It is to be understood that embodiments of the present invention are suitable for use with vehicles in which the transmission 124 is arranged to drive only a pair of front wheels 111, 112 or only a pair of rear wheels 114, 115, i.e. front wheel drive or rear wheel drive vehicles in addition to all wheel drive or selectable two wheel drive/four wheel drive vehicles. Embodiments of the invention are also suitable for vehicles having less than four wheels or more than four wheels.

The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 when the CIMG 123 is operated as a generator.

The vehicle 100 is configured to operate in one of a hybrid electric vehicle (HEV) mode, a HEV inhibit mode in which hybrid functionality is suspended and the engine 121 alone drives the vehicle and a selectable electric vehicle only (EV-only) mode according to the state of a HEV mode selector 169.

In the HEV mode of operation the vehicle 100 is arranged to operate in one of a parallel boost mode, a parallel recharge mode, a parallel idle mode and a vehicle-selected EV mode.

In the parallel boost mode the engine 121 and CIMG 123 both apply positive torque to the transmission 124 (i.e. clutch 122 is closed) to drive the vehicle 100. In the parallel recharge mode the engine 121 applies a positive torque whilst the CIMG 123 applies a negative torque whereby charge is generated by the CIMG 123 to charge the battery 150, whether the vehicle is stationary or moving. In the parallel idle mode the engine 121 applies a positive torque whilst the CIMG 123 applies substantially no torque. In the vehicle-selected EV mode (and in the driver selected EV-only mode) the clutch 122 is opened and the engine 121 is switched off.

The vehicle has a controller 140 configured to control the vehicle 100 to operate in the parallel boost mode, parallel recharge mode or EV mode according to an energy management strategy implemented by the controller 140. The energy management strategy may also be referred to as a HEV control methodology.

It is to be understood that when in HEV mode the controller 140 is configured to determine a target torque that is to be developed by each of the engine 121 and CIMG 123 and to control the engine 121 and CIMG 123 to apply the respective target torques to an input shaft of the transmission 124. For example, if the controller 140 determines that operation in vehicle-selected EV mode is required, the controller 140 sets the target torque from the engine 121 to zero and provides a control signal to switch off the engine 121. If the controller 140 determines that both the engine 121 and CIMG 123 are required to apply positive torque to the driveline 130 the controller 140 controls the engine 121 and CIMG 123 to provide the required values. If the controller 140 determines that the battery 150 is required to be charged, the CIMG 123 is controlled to apply a prescribed negative torque to the driveline 130 whereby the CIMG 123 acts as a generator to generate charge to charge the battery 150.

It is to be understood that other arrangements are also useful.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100.

As noted above, the vehicle 100 has a controller 140 arranged to control the vehicle 100 to switch the engine 121 on and off when in HEV mode according to an energy management strategy.

In the embodiment of FIG. 1 the controller 140 is operable to modify the energy management strategy responsive to data in respect of an expected route of travel of the vehicle 100. The expected route of travel may be determined responsive to an indication received from a driver in respect of the expected destination of the vehicle 100. The indication may be provided by means of a user interface by means of which the driver selects the intended destination. The controller 140 (or a separate route calculation apparatus) is arranged to calculate a route once the destination has been selected. In some embodiments the driver may also input data in respect of a desired route that is to be travelled such as a waypoint or any other suitable data.

In the absence of data in respect of an intended route or destination the controller 140 may apply a route recognition technology to determine an intended destination and route by comparing data in respect of a history of a current route being driven by the vehicle and data in respect of previous routes driven by the vehicle. This technology is described in documents filed concurrently with this specification in connection with this application. The contents of all such documents are incorporated herein by reference.

Figure 3:
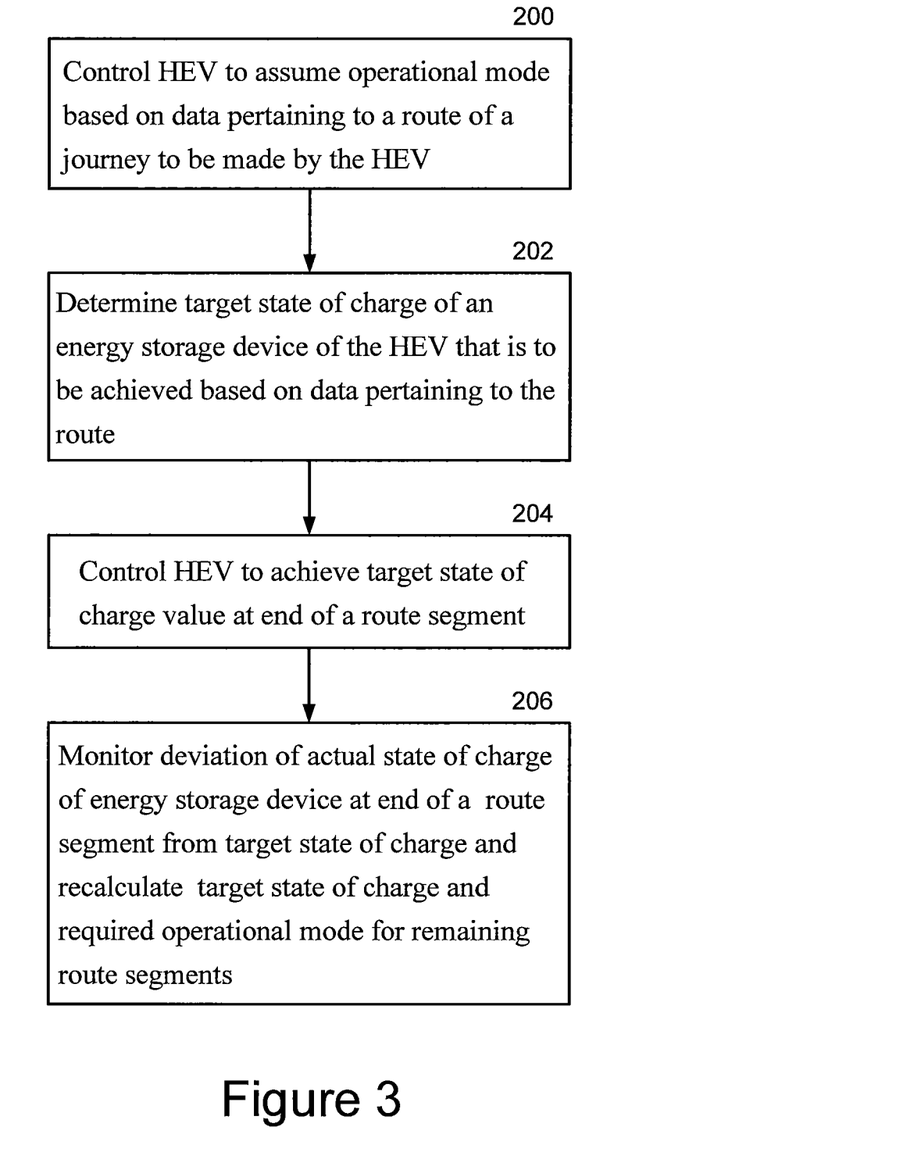
FIG. 3 illustrates a method of controlling a hybrid electric vehicle (HEV), according to some embodiments of the present invention.

According to the present embodiment, once route information is available the controller 140 is arranged to determine in which hybrid powertrain mode (or 'hybrid mode') the vehicle 100 should be operated over a given portion of the route according to a predictive optimisation methodology (Block 200, FIG. 3). The determination in which mode the vehicle 100 should be operated over a given portion of the route is made responsive to data in respect of (i) whether or not the given portion is a built-up area; (ii) a road type over the given portion; (iii) an expected average vehicle speed over the given portion; (iv) a length of the given portion; and (v) whether the vehicle must be operated in EV mode (i.e. with the engine 121 switched off) in a given segment, for example in order to comply with a local law. In some embodiments the controller 140 may not be arranged to take into account data in respect of (v).

Figure 2:
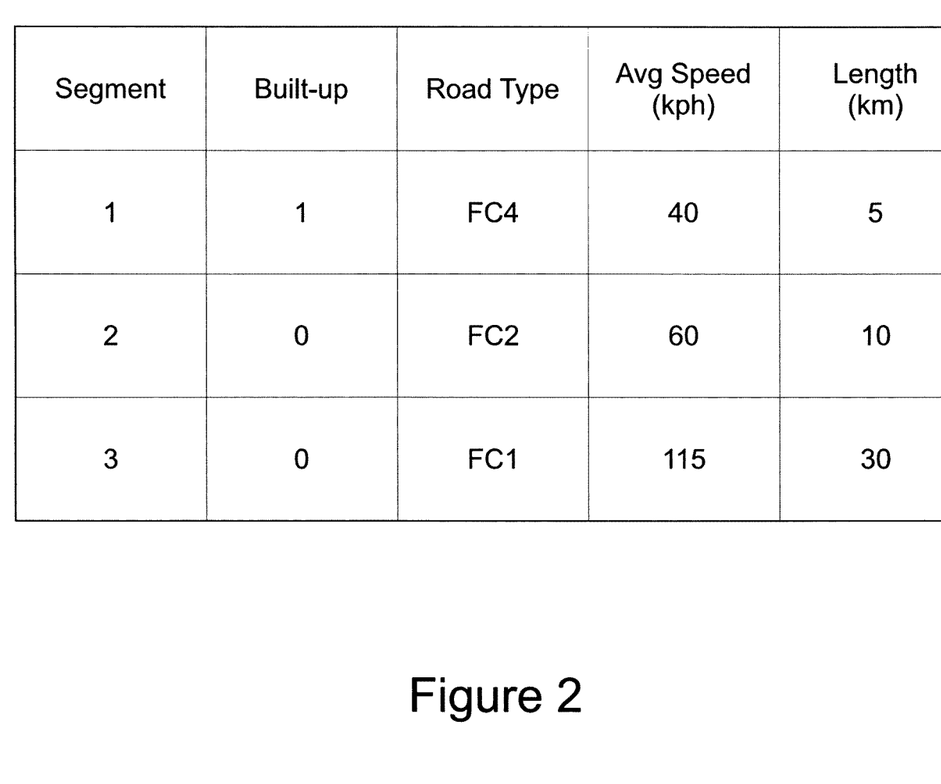
FIG. 2 shows an example of route data in respect of a journey.

FIG. 2 is a schematic representation of example data stored in a memory of the controller 140 in respect of a route the vehicle 100 has previously followed and which has been selected as the route the vehicle 100 is most likely now following again. The data was obtained in the absence of location determining apparatus by detecting turns made by the vehicle 100 and storing data in respect of a direction of each turn, a distance between each turn and average vehicle speed between turns.

Portions of the route between successive vehicle turns will be referred to as route segments.

Each route segment is identified by a unique segment number, in the present example successive integers beginning 1, 2, 3, . . . A parameter Built_up in respect of each segment is set to 1 if the area through which the segment passes is a built-up area and set to zero if it is not. The parameter Road_Type in respect of each segment is given a value corresponding to a type of the road (FC1, FC2, FC3, FC4, etc) for that segment. A parameter Average_Spd provides an indication of an expected average speed of the vehicle 100 over the segment and a parameter Length provides an indication of the length of the segment.

As noted above, in the present embodiment the controller 140 is not provided with location determining means (such as a GPS apparatus) and therefore the controller has no data in respect of an actual location of the vehicle. Thus the controller 140 is unable to obtain data in respect of a given segment (such as whether the segment passes through a built-up area or the type of road) from a map database. However in some embodiments such functionality is provided.

In the present embodiment values of parameters Built_up and Road_Type for a given segment are determined based on a value of the variance of vehicle speed over the segment and a value of the parameter Average_Spd for that segment, in the absence of location information. It is to be understood that other information may be used in addition or instead.

It is to be understood that if data is available in respect of whether the area is a built-up area and in respect of the road type from a source independently of data recorded by the controller 140 this data may be employed instead.

Once a route that is to be followed by the vehicle 100 has been identified, the controller 140 performs an optimisation computation in order to determine a target state of charge of the battery 150 that is to be achieved at the end of each route segment (Block 202, FIG. 3). The controller 140 also determines in which hybrid mode the vehicle 100 should be operated in order to achieve the target state of charge (Block 204, FIG. 3).

The controller 140 is provided with data in respect of powertrain energy use as a function of vehicle speed, road type, driver type and hybrid mode of operation. The data includes data corresponding to a total amount of energy used by the engine 121 and/or CIMG 123 and a change in state of charge of the battery 150 as a function of time. The controller 140 uses this information to determine an optimum value of battery state of charge at the end of each segment. Optionally the controller may also employ data in respect of a variance of vehicle speed.

In some embodiments the controller 140 is operable to determine the driver type responsive to an identity input by the driver, detection of a particular key fob, detection of a seat position of the driver or any other suitable means. In some embodiments the controller 140 is operable to detect the driver type responsive to a driving style of a driver. For example, the controller 140 may monitor a harshness of braking and/or acceleration of the vehicle 100 in order to characterise a driving style of a driver. Other arrangements are also useful.

Once the optimum hybrid mode has been selected for each segment the controller 140 controls the vehicle 100 to assume the selected hybrid mode for each segment as noted above.

However, the vehicle also monitors a deviation of the expected battery state of charge from the actual state of charge during the course of the journey and the amount of energy consumed by the engine 121 and CIMG 123 (Block 206, FIG. 3). The controller 140 is operable to detect whether a fault may exist with the vehicle responsive to any detected deviation. For example if the battery state of charge is lower than expected at the end of a given segment the controller 140 may determine that the CIMG 123 is not charging at an expected rate of charge for a given torque loading on the engine 121 and increase the torque loading applied by the CIMG 123 thereby to generate an increased rate of charging of the battery 150.

The controller 140 may be operable to distinguish between the effects of component ageing and component fault occurrence. In the case that component ageing is detected the controller 140 may be configured to update stored data in respect of vehicle performance (see below) to reflect ageing and use the updated data to determine future values of target state of charge and required hybrid modes to be assumed during a given journey segment in order to optimise vehicle operation. Thus if the charging rate of the CIMG 123 decreases over time due to age, the controller 140 may compensate by controlling the CIMG 123 to apply a higher torque loading over a given segment of a journey. Other arrangements are also useful.

In some embodiments the controller 140 is operable to optimise target state of charge and required hybrid mode for each segment responsive to a set target state of charge at the destination. The target state of charge at the destination may be determined responsive to data in respect of whether or not the battery 150 may be recharged at the destination.

If the battery 150 may be recharged the controller 140 is configured to control the vehicle 100 to arrive at the destination with a relatively low battery state of charge, for example a minimum allowable battery state of charge. If the battery cannot be recharged the controller 140 may control the vehicle 100 to arrive at the destination with a state of charge of a higher value, for example a value of around 50%, or any other suitable value.

The controller 140 may be arranged to determine whether the battery 150 may be recharged at the destination responsive to data in respect of whether the battery 150 was previously recharged at that destination. In some embodiments the vehicle 100 is configured to ask a driver to input data in respect of whether the battery will be recharged at the destination. In some embodiments the vehicle 100 accesses a database in respect of facilities available at an intended destination to determine whether the battery 150 is likely to be recharged. If the destination is (say) a retail outlet listed as having a battery charging facility the controller 140 may be arranged to assume that the battery 150 will be recharged upon arrival at the destination.

In the present embodiment once the controller 140 has established route information for a current journey, including data in respect of expected average vehicle speed over each segment, the controller 140 performs crossover interpolation of the data stored in respect of powertrain energy usage and expected change of state of charge of the battery 150 for each segment of the journey and each possible powertrain mode. The controller 140 assumes that for each journey segment the speed of the vehicle 100 will correspond to the average speed for that segment listed in the journey dataset of FIG. 2, and therefore compiles in the matrix the values of energy consumption corresponding to each respective powertrain mode at that average speed. Where data in respect of driver type is available the controller 140 selects powertrain mode data corresponding to the known driver type.

The controller 140 therefore generates a matrix of data that contains, for each journey segment, an estimate of power usage and change of state of charge for each powertrain mode.

The controller 140 then employs a deterministic dynamic programming control algorithm to determine which of the hybrid modes the controller 140 should employ over each segment of the journey. The determination is made so as to manage a controlled change in the battery SoC from that at the start of the journey to that required at the end of the journey whilst using a minimum amount of total energy from the powertrain. The determination may also be made so as to ensure that when driving in an urban area (i.e. along a route segment for which the parameter Built_up is set to 1), sufficient charge is available for operation in EV mode wherever possible. In particular, if for any segment of the journey operation in EV mode is mandated, for example by legislation, or requested by a driver, the controller is configured to ensure that sufficient charge is available to complete that segment in EV mode. Thus a driver may request that a certain portion of the journey is completed in EV mode, for example a portion through an area for which a charge is levied for non-EV operations or where access is only permitted when operating in EV mode.

Other control algorithms are also useful in addition to or instead of a deterministic dynamic programming control algorithm. Different control algorithms may obtain different minimum values of total powertrain energy usage. They may also require a different powertrain mode to be selected along a given journey segment. They may generate a different target state of charge for a given journey segment.

As noted above, the controller 140 monitors the actual state of charge of the battery 150 during the course of a journey. If the actual state of charge is different from the target state of charge at the end of a segment the controller 140 is arranged to update stored data in respect of a rate of consumption of energy by the powertrain in a given hybrid mode and the expected rate of change of battery state of charge.

In the present embodiment the controller 140 is configured to implement a cost function (or 'cost functional') in respect of the optimum target state of charge for each journey segment, the cost function having a speed-dependent weighting. The cost function is weighted to establish a balance between reaching a target state of charge at the end of a given segment and minimising an amount of energy consumed by the powertrain.

The controller 140 is configured whereby the cost function is weighted towards achieving a lower state of charge when the vehicle is travelling at relatively low speeds. When the vehicle is travelling at relatively high speeds the cost function is weighted towards achieving a higher state of charge. The purpose of this change in weighting is to protect an ability of the vehicle 100 to operate in EV mode when in an urban environment whilst optimising total powertrain energy consumption over the course of a journey.

Embodiments of the invention have the advantage that a HEV may be controlled in a more energy efficient manner within the limits of available computing resources. Furthermore, driver enjoyment may be enhanced because vehicle operations may be conducted in a manner that is more likely to meet driver expectations. That is, because the controller is provided with information in respect of a route a vehicle is to follow the controller may be configured to increase a likelihood that the HEV is able to operate in EV mode in an urban or built-up area. This has the advantage that an amount of emissions of one or more gases by a HEV in an urban area may be reduced.

Embodiments of the present invention may be understood by reference to the following numbered paragraphs.

1. A controller operable to control a hybrid electric vehicle (HEV) to assume one of a plurality of modes of operation in each of which each of a plurality of actuators of a HEV is controlled to assume a prescribed operational state,
the controller being configured to control the HEV to assume a selected one of the plurality of operational modes in dependence on data in respect of a route of a journey to be made by the HEV, a route comprising at least one route segment, the controller being configured to determine a target value of state of charge of an energy storage device of the HEV for each said at least one route segment being a value of state of charge of an energy storage device that is to be achieved at the end of said at least one segment in dependence on the data in respect of a route, the controller being further configured to control the HEV to achieve the target state of charge value at the end of said at least one segment.

2. A controller as described in paragraph 1 configured to select a target state of charge of an energy storage device in response to data in respect of an amount of energy consumed by a plurality of actuators and a change in state of charge of an energy storage device in each operational mode as a function of vehicle speed.

3. A controller as described in paragraph 2 operable to select a target state of an energy storage device in response to data in respect of an amount of energy consumed by a plurality of actuators and a change in state of charge of an energy storage device in each operational mode at an expected speed of a vehicle over a route segment.

4. A controller as described in paragraph 1 operable to select a target state of charge responsive to data in respect of a type of a driver.

5. A controller as described in paragraph 4 operable to determine a type of driver responsive to at least one selected from amongst an identity of a device carried by a driver, an input provided by a driver and a driving style of a driver.

6. A controller as described in paragraph 1 operable wherein if a journey comprises a plurality of segments the controller is configured to monitor a deviation of an actual state of charge of an energy storage device at an end of a given route segment from a target state of charge and to recalculate at least one of a target state of charge and a required operational mode for each remaining segment in response to the deviation.

7. A controller as described in paragraph 1 configured to set a target value of state of charge of an energy storage device that is to be achieved at a destination of a vehicle in response to data in respect of a particular destination.

8. A controller as described in paragraph 7 configured to set a target state of charge in response to a determination whether an energy storage device will be recharged at the destination.

9. A controller as described in paragraph 8 operable to determine whether a recharging facility is available at the destination in response to at least one selected from amongst data in respect of a historical journey made by the vehicle and a database of recharging facilities.

10. A controller as described in paragraph 1 arranged to determine, for each operational mode of the HEV, an amount of energy that would be required to complete each route segment in that mode and a change in state of charge of an energy storage device over a segment at a prescribed average speed in that mode said speed being a speed in respect of each segment, the controller being further configured to determine an optimum operational mode for each segment and an optimum target state of charge value of an energy storage device that is to be achieved by the end of each route segment according to one or more optimisation control algorithms.

11. A controller as described in paragraph 10 arranged to apply the control algorithm thereby to minimise a total amount of energy consumed by a plurality of actuators over a route.

12. A controller as described in paragraph 10 further configured to apply a deterministic dynamic programming control algorithm to determine which of the HEV operational modes should be employed over each segment of a journey.

13. A controller as described in paragraph 1 wherein said at least one characteristic of said at least one route segment is selected from amongst a length thereof, a type of road thereof, an expected average speed of a HEV therealong, an expected variance of speed of a HEV therealong, an expected average journey time therealong and an indication whether a segment corresponds to a built-up area.

14. A controller as described in paragraph 1 configured to determine a target value of state of charge of an energy storage device to be achieved at the end of each route segment in order to improve one or more performance parameters of a HEV relative to operation in a HEV mode in which only at least one fuel burning actuator is switched on and employed to provide traction to drive a HEV for each segment of a journey.

15. A controller as described in paragraph 14 wherein the one or more performance parameters correspond to one or more selected from amongst an amount of a given gas emitted by at least one fuel burning actuator of the vehicle over the course of a journey, an amount of fuel consumed by at least one fuel burning actuator over the course of a journey and an amount of time for which at least one fuel burning actuator is switched on over the course of a journey.

16. A controller as described in paragraph 1 wherein each route comprises a plurality of route segments, the controller being configured to determine a respective target value of state of charge of an energy storage device of the HEV for each route segment, being a value of state of charge of the energy storage device that is to be achieved at the end of each segment.

17. A HEV comprising a controller as described in paragraph 1, the HEV comprising a plurality of actuators including at least one fuel burning actuator and at least one electric machine.

18. A HEV as described in paragraph 17 operable in a series HEV mode wherein the at least one fuel burning actuator is not operable to drive the HEV.

19. A HEV as described in paragraph 17 operable in a parallel HEV mode in which the at least one fuel burning actuator and the at least one electric machine are each operable to drive the HEV.

20. A HEV as described in paragraph 17 wherein the at least one fuel burning actuator comprises an engine.

21. A method of controlling a hybrid electric vehicle (HEV) to assume one of a plurality of modes of operation in each of which each of a plurality of actuators of a HEV is controlled to assume a prescribed operational state,
the method comprising controlling the HEV to assume an operational mode in dependence on data in respect of a route of a journey to be made by the HEV, a route comprising at least one route segment,
the method comprising determining a value of target state of charge of an energy storage device of the HEV for each said at least one route segment being a value of state of charge of the energy storage device that is to be achieved at the end of said at least one segment in dependence on the data in respect of a route, and
controlling the HEV to achieve the target state of charge value at the end of said at least one segment.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification. The contents of all such papers and documents are incorporated herein by reference.

The invention claimed is:

1. A controller operable to control a hybrid electric vehicle (HEV) to assume one of a plurality of modes of operation in each of which each of a plurality of actuators of the HEV is controlled to assume a prescribed operational state, the plurality of actuators including at least one fuel burning actuator and at least one electric machine,
the controller being configured to control the HEV to assume a selected one of the plurality of operational modes based on data pertaining to a route of a journey to be made by the HEV, the route comprising a plurality of route segments, the controller being configured to determine, for an end of each of said plurality of route segments, a target state of charge of an energy storage device of the HEV that is to be achieved based on the data pertaining to the route,
the controller being further configured to control the HEV to achieve the target state of charge at the end of said at least one route segment, and
the controller being further configured to monitor a deviation of an actual state of charge of the energy storage device at an end of a given one of the plurality of route segments from the target state of charge for the given one of the plurality of route segments, and to detect whether a fault exists with the vehicle responsive to the deviation, and to recalculate a required operational mode for at least one of the remaining ones of the plurality of route segments in response to the deviation.

2. The controller of claim 1, configured to select the target state of charge of the energy storage device in response to data in respect of an amount of energy consumed by the plurality of actuators and a change in state of charge of the energy storage device in each operational mode as a function of vehicle speed.

3. The controller of claim 1, operable to select the target state of the energy storage device in response to data in respect of an amount of energy consumed by the plurality of actuators and a change in state of charge of the energy storage device in each operational mode at an expected speed of a vehicle over a route segment.

4. The controller of claim 1, operable to select the target state of charge responsive to data in respect of a type of a driver.

5. The controller of claim 4, operable to determine the type of the driver responsive to at least one selected from amongst an identity of a device carried by the driver, an input provided by the driver and a driving style of the driver.

6. The controller of claim 1, configured to set the target value of state of charge of the energy storage device that is to be achieved at a destination of a vehicle in response to data in respect of a particular destination.

7. The controller of claim 6, configured to set the target state of charge in response to a determination whether the energy storage device will be recharged at the destination.

8. The controller of claim 7, operable to determine whether the energy storage device will be recharged at the destination in response to at least one selected from amongst data in respect of a historical journey made by the vehicle, a database of recharging facilities and an input received from a user.

9. The controller of claim 1, arranged to determine, for each operational mode of the HEV, an amount of energy that would be required to complete each route segment in that mode and a change in state of charge of the energy storage device over a route segment at a prescribed average speed in that mode said speed being a speed in respect of each route segment, the controller being further configured to determine an optimum operational mode for each route segment and an optimum target state of charge value of the energy storage device that is to be achieved by the end of each route segment according to one or more optimisation control algorithms.

10. The controller of claim 9 arranged to apply the control algorithm thereby to minimise a total amount of energy consumed by the plurality of actuators over the route.

11. The controller of claim 9, further configured to apply a deterministic dynamic programming control algorithm to determine which of the HEV operational modes should be employed over each route segment of the journey.

12. The controller of claim 1, wherein data pertaining to said at least one route segment is selected from amongst a length thereof, a type of road thereof, an expected average speed of a HEV therealong, an expected variance of speed of a HEV therealong, an expected average journey time therealong and an indication whether a route segment corresponds to a built-up area.

13. The controller of claim 1, configured to determine the target value of state of charge of the energy storage device to be achieved at the end of each route segment in order to improve one or more performance parameters of the HEV relative to operation in a HEV mode in which only at least one fuel burning actuator is switched on and employed to provide traction to drive the HEV for each route segment of the journey.

14. The controller of claim 13, wherein the one or more performance parameters correspond to one or more selected from amongst an amount of a given gas emitted by at least one fuel burning actuator of the vehicle over the course of a journey, an amount of fuel consumed by at least one fuel burning actuator over the course of a journey and an amount of time for which at least one fuel burning actuator is switched on over the course of a journey.

15. The controller of claim 1, wherein the route comprises a plurality of route segments, the controller being configured to determine a respective target value of state of charge of the energy storage device of the HEV for each route segment that is to be achieved at the end of each route segment.

16. The controller of claim 1, further configured to determine that the at least one electric machine is not charging the energy device at an expected rate of charge for a given torque loading applied to the at least one fuel burning actuator by the at least one electric machine and to increase the torque loading applied by the at least one electric machine to the at least one fuel burning actuator, thereby to generate an increased rate of charging of the energy storage device.

17. A hybrid electric vehicle (HEV), comprising:
a plurality of actuators including at least one fuel burning actuator and at least one electric machine; and
a controller operable to control the HEV to assume one of a plurality of modes of operation in each of which each of the plurality of actuators is controlled to assume a prescribed operational state,
wherein the controller is configured to control the HEV to assume a selected one of the plurality of operational modes based on data pertaining to a route of a journey to be made by the HEV, the route comprising a plurality of route segments, the controller being configured to determine, for an end of each of said plurality of route segments, a target state of charge of an energy storage device of the HEV that is to be achieved based on the data pertaining to the route,
wherein the controller is configured to control the HEV to achieve the target state of charge at the end of said at least one route segment, and
wherein the controller is configured to monitor a deviation of an actual state of charge of the energy storage device at an end of a given one of the plurality of route segments from the target state of charge for the given one of the plurality of route segments, and to detect whether a fault exists with the vehicle responsive to the deviation, and to recalculate a required operational mode for at least one of the remaining ones of the plurality of route segments in response to the deviation.

18. The HEV of claim 17, operable in a series HEV mode wherein the at least one fuel burning actuator is not operable to drive the HEV.

19. The HEV of claim 17, operable in a parallel HEV mode in which the at least one fuel burning actuator and the at least one electric machine are each operable to drive the HEV.

20. The HEV of claim 17, wherein the controller is configured to determine that the at least one electric machine is not charging the energy storage device at an expected rate of charge for a given torque loading applied to the at least one fuel burning actuator by the at least one electric machine and to increase the torque loading applied by the at least one electric machine to the at least one fuel burning actuator, thereby to generate an increased rate of charging of the energy storage device.

21. A method of controlling a hybrid electric vehicle (HEV) to assume one of a plurality of modes of operation in each of which each of a plurality of actuators of a HEV is controlled to assume a prescribed operational state, the plurality of actuators including at least one fuel burning actuator and at least one electric machine, the method comprising:
controlling the HEV to assume an operational mode based on data pertaining to a route of a journey to be made by the HEV, a route comprising a plurality of route segments;
determining, for an end of each of said plurality of route segments, a target state of charge of an energy storage device of the HEV that is to be achieved based on the data pertaining to the route;
controlling the HEV to achieve the target state of charge value at the end of said at least one route segment; and
monitoring a deviation of an actual state of charge of the energy storage device at an end of a given one of the plurality of route segments from the target state of charge for the given one of the plurality of route segments, and detecting whether a fault exists with the vehicle responsive to the deviation, and recalculating a required operational mode for at least one of the remaining ones of the plurality of route segments in response to the deviation.

* * * * *

UNITED STATES PATENT AND TRADEMARK OFFICE
CERTIFICATE OF CORRECTION

PATENT NO. : 9,821,791 B2  
APPLICATION NO. : 14/374394  
DATED : November 21, 2017  
INVENTOR(S) : Clement Dextreit Page 1 of 1

It is certified that error appears in the above-identified patent and that said Letters Patent is hereby corrected as shown below:

In the Claims

Column 17, Claim 16, Line 61: Please correct "energy device" to read --energy storage device--

Signed and Sealed this  
Twenty-fourth Day of April, 2018

Andrei Iancu  
*Director of the United States Patent and Trademark Office*